Figure 1:
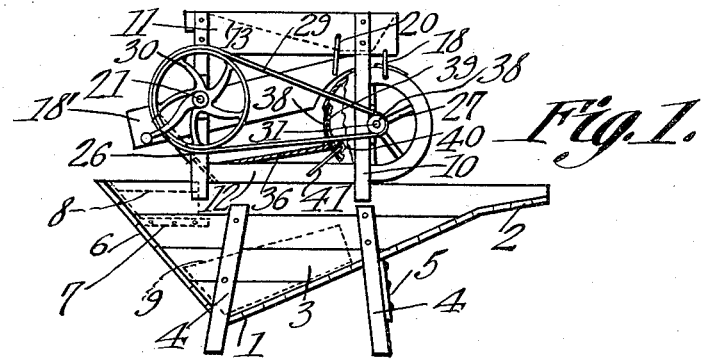

H. LYNG.
GRAIN TREATING MACHINE.
APPLICATION FILED MAY 13, 1913.

1,080,069. Patented Dec. 2, 1913.

Witnesses

Henry Lyng, Inventor
by C. A. Snow & Co., Attorneys

UNITED STATES PATENT OFFICE.

HENRY LYNG, OF AURDAL, MINNESOTA.

GRAIN-TREATING MACHINE.

1,080,069.     Specification of Letters Patent.     Patented Dec. 2, 1913.

Application filed May 13, 1913. Serial No. 767,409.

*To all whom it may concern:*

Be it known that I, HENRY LYNG, a citizen of the United States, residing at the town of Aurdal, in the county of Ottertail and State of Minnesota, have invented a new and useful Grain-Treating Machine, of which the following is a specification.

This invention relates to a machine for the treating of grain and seeds.

An object of the present invention is to provide a machine which is adapted to grade and clean seeds and grain.

A further object is to provide a machine adapted to separate foul seeds and what are known as smut balls from the good seeds.

A further object is to provide a machine which may be used as a fanning mill and in combination therewith a water containing tank, which water may contain a suitable disinfectant therein.

A further object is to provide a machine with a fan blower and a tank disposed therebeneath whereby the grain which drops upon the water within the tank is blown into a tank partially submerged and the heavier material will sink into a grain receiving tank disposed at the bottom of the main tank.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 2:
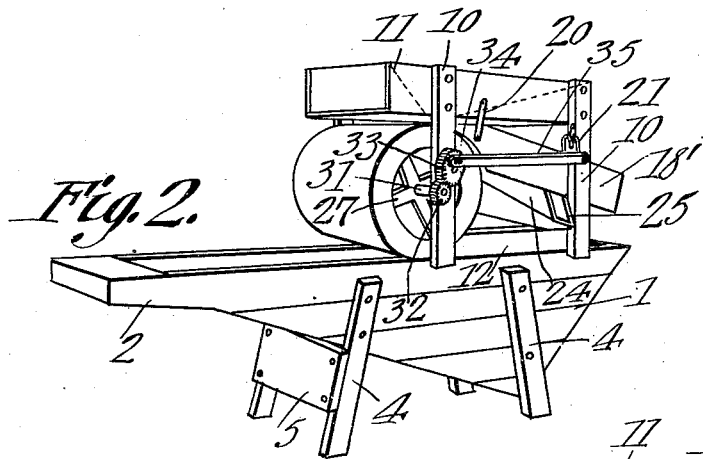
Figures 3, 4:
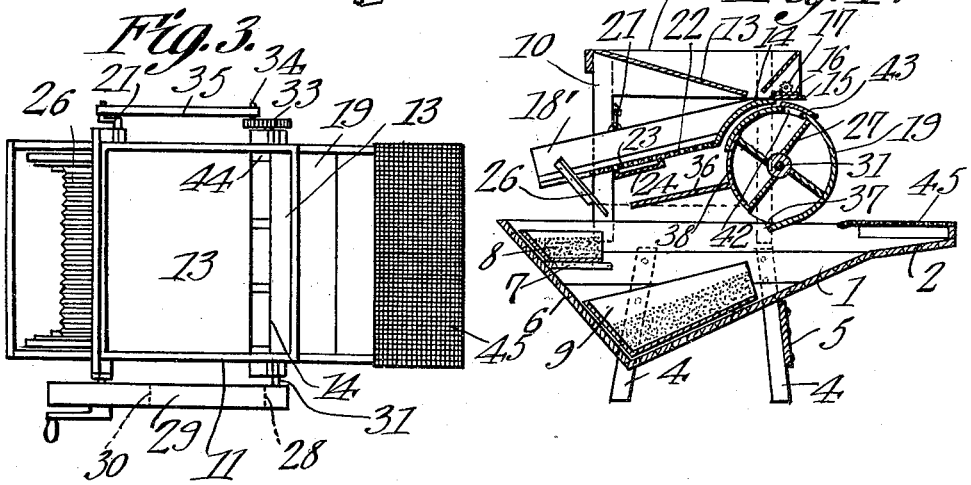

Figure 1 is a side view in elevation of my improved apparatus. Fig. 2 is a perspective view thereof looking from the opposite side. Fig. 3 is a top plan view with portions thereof broken away. Fig. 4 is a vertical cross sectional view taken upon a longitudinal axis of the apparatus.

Referring to the drawings in which similar reference numerals designate corresponding parts throughout the several views, 1 is a tank substantially triangular in outline and is provided with the elongated shelf 2 extending from what is termed the back of the tank. The said tank and projecting shelf is preferably formed of wood provided with a liquid-tight metallic lining therein, though it is obvious that the tank may be made of other material provided that a liquid-tight inclosure is obtained. Rigidly secured to the side walls 3 of the tank 1 are the downwardly projecting legs 4 with suitable braces 5 extending therebetween and which supporting legs are adapted to retain the tank with the upper edge thereof disposed in a horizontal manner.

The front wall 6 of the tank 1 is provided with an outstanding bracket 7, the same extending around and secured to the side walls as illustrated in Fig. 4. A receptacle 8 is positioned upon and supported by the outstanding bracket 7 and is termed a dirt receiving receptacle, by which is meant that the said receptacle is adapted to collect and retain therein the objectionable material which always accompanies grain; smut balls, wild oats, etc., being examples of what is termed objectionable material. The tank 1 is adapted to receive water therein and with the level thereof slightly above the upper extremity of the receptacle 8 so that the same will be entirely submerged and the material which is delivered upon the surface of the water will pass over the edges of the said receptacle 8. A second receptacle 9 is positioned upon the bottom of the tank 1 and is shaped so as to conform with the lower vertex of the triangular tank so as to always assume the same position within the tank. The receptacle 9 is termed a grain receiving receptacle and is adapted to collect therein the grain which upon being delivered to the surface of the water, immediately sinks and as the same is delivered directly above the said grain receiving receptacle it will be collected therein, it being pointed out that the foreign material will be considerably lighter than the grain and will, by means of an air current, be blown along the surface of the water above the dirt receiving receptacle 8 and will gradually collect within said receptacle. The dirt and grain receiving receptacles 8 and 9 are provided with a plurality of apertures or perforations extending therethrough, the same being small enough to prevent the grain or material which has collected therein from passing through the said perforations when the receptacles are withdrawn from the tank and allowed to drain.

The supporting legs 4 which are rigidly secured to the side walls of the tank stop short of the upper edge thereof so that the supporting legs 10 of a superstructure may extend down partially over the said side walls and slidably engage the same. The said superstructure comprises the top receptacle 11 which is a hopper and to the side walls of which are rigidly secured the said supporting legs 10. Rigidly secured to the supporting legs 10 and extending therebetween are the beams 12 which are adapted to rest upon the upper edges of the side walls 3 to thereby support the entire superstructure and to mount the same slidable with respect to the tank. The supporting legs 10 of the superstructure extend down a short distance below the upper extremity of the side walls of the tank to thereby guide the said superstructure in its sliding movement, it being pointed out that the weight of the superstructure will hold the same upon the tank in a stable manner and that the friction exerted between the tank and superstructure will be sufficient to maintain the two in adjusted position. The hopper 11 is provided with the downwardly slanting bottom walls 13 which are provided with a suitable opening 14 therebetween and in order to provide closing means for the same, the plate 15 is provided with a pair of rack bars 16 positioned upon and secured to the edges thereof and which bars are engaged and adapted to be actuated by the spur wheel pinions 17 which are mounted upon a suitable shaft provided with the handle 18 at one end thereof. From the foregoing it will be apparent that the outlet from the hopper may be regulated, the valve-like plate 15 sliding upon suitable guides 44.

Positioned directly beneath the hopper 11 is the screening sieve 18' the back portion of which extends under the delivery outlet of the hopper and is adapted to receive the material as it passes therefrom. The back portion of the screening sieve is arcuated so as to accommodate the fan blower casing 19 which is also positioned directly beneath the rear portion of the hopper. The screening sieve 18' is supported at its rear portion by the links 20 and is pivotally secured adjacent its front end upon a crank shaft 21 which is rotatably secured to the supporting legs 10, from which it will be apparent that when the crank shaft 21 is rotated, the screening sieve will be given an oscillatory motion to thereby effect an efficient screening of the material which passes over the screens of the sieve. The bottom plate 22 of the sieve is provided with a detachable screen 23, the same being detachably secured in place so that one of a number of screens may be used of different mesh according to the grain which is to be treated. Positioned directly beneath the screen 23 is an outlet spout 24, the same sloping downward and to one side and being provided with the open delivery end 25 so that the grain which passes through the screen 23 will be delivered from the end 25 of the spout beyond the side walls of the tank and into a suitable receiving receptacle which may be positioned therebeneath. The front end of the sieve 18' is open and a guide plate 26 is positioned therebeneath and angularly disposed with respect thereto whereby the material which passes beyond the screen 23 of the sieve falls upon the guide plate 26 which is provided with a number of longitudinal corrugations or ridges whereby the material which is passed beyond the screen will be directed downwardly upon the surface of the water which is disposed within the tank. The longitudinal corrugations serve to check the velocity of the material falling from the sieve and furthermore tend to lay the same gently down upon the surface of the water in a smooth manner and with the longitudinal axis of the material substantially parallel with the longitudinal axis of the tank.

Disposed within the cylindrical fan casing 19 is the fan wheel 27 which is rotatably secured to the supporting legs 10 and is provided with a pulley wheel 28 secured thereto and over which extends a belt 29 which in turn extends over and is driven by the manually operable pulley wheel 30. The supporting shaft 31 upon which the fan wheel 27 is rotatably mounted is provided with the spur gear 32 rigidly secured thereto and meshing therewith is a second spur gear wheel 33, the latter having an arm 34 projecting eccentrically therefrom and to which is secured the pitman 35. The pitman 35 is secured at its remote end to the crank shaft 21 and is adapted to rotate the same, from which it will be apparent that when the manually operable wheel 30 is rotated, the fan blower will be driven to thereby create an artificial draft of air and at the same time the crank shaft 21 will be actuated to thereby oscillate the sleeve 18'. The fan wheel casing 19 is broken away adjacent the lower portion and extending approximately radial to the fan wheel and terminating central of the said casing opening is an air spout 36, the bottom of which is open and is adapted to direct the draft of air produced by the fan wheel down upon the surface of the liquid disposed within the tank. The opening 37 in the fan wheel casing, approximately one half of which communicates with the air spout 36, is provided with a sliding arcuated plate 38 adapted to move there in front and to close the said opening. The arcuated plate 38 which acts as a slide valve for the air fan blower is provided with a rack bar 39 secured thereto, the same being illustrated in Fig. 1 of the drawings, and adapted to mesh therewith is a suitable pinion gear 40 which is rotatably supported upon a shaft provided with an outer actuating handle 41. The slide valve plate 38 is adapted to slide or move in a circle about the shaft 31 as a center and is of sufficient size so that it may extend across the entire opening 37 of the fan casing. When the plate is in the position as illustrated in Fig. 4 of the drawings, it serves to regulate and to direct a current of air down upon the surface of the liquid disposed within the tank 1, the velocity and amount of air directed thereon being proportionate to the opening of the said valve plate. The valve plate 38 may be also lowered so as to expose the under portions of the sieve to a blast of air as is the case in the ordinary fanning mill. The fan casing 19 is provided with the opening 42 at the upper portion thereof and which is provided with a hinged lid 43 for the closing thereof, the opening 42 being for the purpose of directing a draft of air down upon the sieve screen, this being necessary or desirable in cleaning timothy and other grass seed, it being noted that either the rotation of the pulley wheel 30 will be reversed or the belt twisted so as to turn the fan wheel in a direction opposite to that in which it is turned when the lower opening 37 is used.

The grain which is to be treated will be placed in the hopper 11 and the said grain will contain such foreign material as smut balls, wild oats, foul seeds and stubble. The handle 18 will then be turned until the valve plate 15 which is supported upon the guides 44 as illustrated in Fig. 3 of the drawings, is withdrawn from the hopper opening which allows the said material to drop down into the sieve 18'. The driving wheel 30 is now rotated and the same will operate the fan blower and also impart an oscillatory movement to the said sieve. The material disposed thereon will be shaken and the same will either pass through the screen and out of the spout 24 or will drop upon the corrugated plate 26. Taking the case where wheat is to be cleaned, graded and treated, the wheat is run over the screens of the sieve which will be provided with holes large enough to allow all of the wheat to pass therethrough and to therefore be delivered from the outlet 25 of the spout and the wild oats and stubble will pass over the said screen and drop upon the corrugated plate down which it will slide to the top surface of the liquid disposed within the tank. The fan blower will produce a current of air which is deflected downward against the top surface of the water which will therefore blow the said stubble and material which has passed down the corrugated plate, to the front end of the tank and over the dirt receiving receptacle 8 wherein it will gradually settle. A new screen is now positioned in the sieve coarse enough to grade the wheat when the same is again introduced into the hopper and passed over the said screen. The finer wheat will pass through the screen and into the spout and the coarser grains along with such wild oats as may be present with the wheat will fall upon the corrugated plate and will slide gently into the liquid. The draft of air produced by the fan blower drives the wild oats and stubble into the dirt receiving receptacle 8 while the large wheat kernels will immediately sink into the grain receiving receptacle 9. The grain receiving receptacle 9 is then withdrawn and positioned upon a grate 45 which extends across the rear portion of the tank and is allowed to remain thereon until the water drains through the apertures with which the said receptacle is provided. Should it be so desired, a suitable disinfectant may be added to the liquid contained in the tank according to the grain being treated and the purpose for which the grain is to be subsequently used.

When the machine is to be used as a fanning mill, the fan casing valve plate 38 will be rotated so as to close the air from the air spout 36 and will force the same beneath the screen sieve in the usual manner. A fanning action will thereby be obtained and may be used during the treating of the grain.

When it is desired to clean and grade timothy, clover or other grass seed, the bottom 22 of the sieve is removed and a screen inserted therefor so that the seed will pass down through the said screen and upon the top of the air spout 36 from which it may be removed and collected. In order to clean the said seed, the valve slide plate 38 is placed in front of the opening 37 and the hinged flap or valve 43 is opened and the fan wheel reversed so that the current of air will be forced out of the top of the fan casing and down upon the sieve and seed which is passing thereover, it being noted that the tank is not filled with any liquid in this case.

From the foregoing it will be apparent that wheat and barley and similar grain may be cleaned and graded, separated from smut balls, wild oats and stubble, and furthermore by the use of formaldehyde or other disinfectant the said grain can be cured and disinfected. The superstructure is slidably mounted upon the tank and may be removed therefrom if it should be so desired, in which instance the tank can be used for various other purposes. The superstructure is moved toward the front end of the tank when the grain receiving receptacle is to be drawn rearwardly therefrom.

Having thus fully described the invention, what I claim to be new and original with me is:—

1. In an apparatus of the class described, the combination of a liquid containing tank, a superstructure mounted above the said tank and including a hopper, a longitudinal corrugated plate angularly disposed with respect to the horizontal and adapted to receive material from said hopper, said corrugated plate adapted to deposit the material from said hopper onto the surface of said liquid, and a fan blower supported by the said superstructure adapted to direct a current of air upward above the said corrugated plate, said fan blower further adapted to direct a current of air upon the said liquid and in alinement with the longitudinal axis of said tank.

2. In a grain cleaning and grading machine, the combination of a liquid containing tank, a grain receiving receptacle submerged therein, a foreign material receiving receptacle submerged therein at one end thereof, a superstructure comprising a hopper, screening means positioned beneath said hopper, a longitudinal corrugated plate supported by said superstructure and receiving grain containing material from said screening means and adapted to deposit grain containing material upon the surface of the liquid, and a fan blower with means for actuating the same secured to said superstructure and adapted to direct a current of air upon the surface of said liquid in the direction of the foreign material receiving receptacle.

3. In an apparatus of the class described the combination of a liquid containing tank, a superstructure mounted upon the said tank and including a hopper, screening means disposed beneath said hopper adapted to receive material therefrom and to deliver grain containing material from its lower end, and means for receiving said grain containing material from the said screening means and for depositing the same upon the surface of the liquid in a gentle manner, and a fan blower secured to said superstructure and adapted to direct a current of air upon the surface of said liquid to thereby separate the grain from the other ingredients of said material.

4. In an apparatus of the class described, the combination of a liquid containing tank, a superstructure mounted upon and supported by the said tank and comprising a hopper, screening means disposed therebeneath and adapted to separate the material received therefrom into two classes, delivering one of said classes to one side of the said superstructure, and delivering the other of said classes to a longitudinally corrugated plate, said longitudinally corrugated plate angularly disposed with respect to said screening means and adapted to receive material therefrom, said corrugated plate adapted to gently deposit the material from said screening means onto the surface of the said liquid, and a fan blower supported by the said superstructure adapted to direct a current of air upward beneath the said sieve, said fan blower further adapted to direct a current of air upon the said liquid and in alinement with the longitudinal axis of said tank.

5. The combination with a tank and means for collecting grain and foreign material in separate receptacles therein, of a superstructure supported by the said tank and comprising a hopper, an opening disposed at the base thereof, and means for regulating the said opening, screening means disposed beneath said hopper, a fan casing disposed at one end of said superstructure and provided with an air spout leading therefrom, means for closing the said air spout, said fan casing provided with an opening adapted to supply air beneath said screening means, means for closing this opening, said fan casing provided with a third opening adjacent the top thereof and means for closing the same, said third mentioned opening adapted to direct a current of air above and across the said screening means.

In testimony that I claim the foregoing as my own, I have hereto affixed my signature in the presence of two witnesses.

HENRY LYNG.

Witnesses:
 ANTON THOMPSON,
 AUGUSTA ANDERSON.

---

Copies of this patent may be obtained for five cents each, by addressing the "Commissioner of Patents, Washington, D. C."